(12) United States Patent
Honeysett

(10) Patent No.: US 10,843,631 B1
(45) Date of Patent: Nov. 24, 2020

(54) PICKUP TRUCK BED ACCESS LADDER

(71) Applicant: Gerald L. Honeysett, Enumclaw, WA (US)

(72) Inventor: Gerald L. Honeysett, Enumclaw, WA (US)

( * ) Notice: Subject to any disclaimer, the term of this patent is extended or adjusted under 35 U.S.C. 154(b) by 0 days.

(21) Appl. No.: 16/795,940

(22) Filed: Feb. 20, 2020

(51) Int. Cl.
*B60R 3/00* (2006.01)
*B60R 3/02* (2006.01)

(52) U.S. Cl.
CPC ....................... *B60R 3/02* (2013.01)

(58) Field of Classification Search
CPC ................... B60R 3/02; B60R 3/007
See application file for complete search history.

(56) References Cited

U.S. PATENT DOCUMENTS

| | | | |
|---|---|---|---|
| 3,907,064 A | 9/1975 | Svalberg et al. | |
| 4,531,612 A | 7/1985 | Sandor | |
| 4,867,275 A | 9/1989 | Islava et al. | |
| 5,499,692 A * | 3/1996 | Brook | E06C 1/56 182/196 |
| 5,605,205 A * | 2/1997 | Douglas | E06C 1/56 182/198 |
| 5,628,380 A | 5/1997 | Matisi | |
| 6,012,549 A * | 1/2000 | Adams | A62B 1/20 182/196 |
| 6,499,564 B2 * | 12/2002 | Puglisi | B60R 3/007 182/127 |
| 6,530,455 B1 * | 3/2003 | Arnette | E06C 1/525 182/198 |
| 7,051,497 B2 * | 5/2006 | Peterson | B68C 1/00 54/44.1 |
| D541,431 S * | 4/2007 | Donovan | D25/64 |
| 7,938,229 B2 | 5/2011 | Davies | |
| 10,106,208 B2 * | 10/2018 | Barrios Albert | B60R 3/02 |
| 2002/0189903 A1 * | 12/2002 | Krish, Jr. | B63B 27/14 182/206 |
| 2004/0232649 A1 * | 11/2004 | Lambie | B60R 3/007 280/163 |
| 2005/0252720 A1 * | 11/2005 | Chant | E06C 5/02 182/127 |
| 2006/0283666 A1 * | 12/2006 | Zhou | E06C 1/36 182/206 |

FOREIGN PATENT DOCUMENTS

| | | |
|---|---|---|
| CN | 108252646 B | 5/2019 |
| SU | 1476098 A1 | 4/1989 |

* cited by examiner

*Primary Examiner* — Brian L Swenson
(74) *Attorney, Agent, or Firm* — R. Reams Goodloe, Jr.

(57) ABSTRACT

An access ladder for access to a pickup truck bed. The access ladder includes a base having a pair of spaced apart "J" shaped brackets, with the proximal end having an open jaw sized and shaped so that it can be releasably secured to the pickup truck bed. The "J" shaped brackets are spaced apart by spacers, and optionally, a step plate. A protective mat may be provided to protect the surface of the pickup truck bed against scratching or abrasion. A handle may be provided for assisting users with balance as they ingress or egress from a pickup truck bed. A plurality of steps are affixed to the "J" shaped brackets. The steps are provided at fixed intervals along a pair of flexible support members, which in an embodiment, may be ropes. Support stops are used to set spacing of steps along the flexible support members. Bumpers may be provided at each step to further protect the outer surface of the pickup truck.

14 Claims, 5 Drawing Sheets

PICKUP TRUCK BED ACCESS LADDER

STATEMENT OF GOVERNMENT INTEREST

Not Applicable.

COPYRIGHT RIGHTS IN THE DRAWING

A portion of the disclosure of this patent document contains material that is subject to copyright protection. The patent owner has no objection to the facsimile reproduction by anyone of the patent document or the patent disclosure, as it appears in the Patent and Trademark Office patent file or records, but otherwise reserves all copyright rights whatsoever.

RELATED PATENT APPLICATIONS

None.

TECHNICAL FIELD

This disclosure relates to ladders, and in particular, to ladders configured for use with vehicles such as a pickup truck or the like.

BACKGROUND

A continuing need exists for improvements in access systems for use in accessing the rear beds in a variety of vehicles, and in particular, pickup trucks. Often, pickup trucks park at locations where the pickup truck bed has a sidewall that is at a level above the ground where ease and/or safety of access to the vehicle may be facilitated by the availability of a ladder. Further, quite often a vehicle is parked over sloping or uneven ground, so placement of legs on the ground, for support or stability, is often problematic in prior art designs of which I am aware. A wide variety of stair structures have been known and utilized as appropriate for various designs, with the most common design currently offered being a rear tailgate for pickup trucks that has a built-in stair system. And, although such prior art stair structures have been constructed which in some limited fashion enable a user to get access to a pickup truck bed, such designs as presently offered to the public are quite expensive. Thus, there remains a continuing and unmet need for a stair or ladder system for use with pickup trucks which may be safely stowed, easily deployed, and implemented with minimal cost and expense.

SOME OBJECTS, ADVANTAGES, AND NOVEL FEATURES

An objective of my invention is to provide a design for a ladder for access to a pickup truck bed which is portable.

Another objective of my invention is to provide a design for a ladder for access to a pickup truck bed in which the distance between steps is uniform.

Another important objective is to provide an access ladder design which can be deployed with a handle for enhancing stability and balance of the user.

A related and important objective is to provide an access ladder design in which the stairs are sturdy and of high strength.

Another important objective is to provide an access ladder which can be compactly stowed when not in use.

An important objective is to provide an access ladder design in which bumpers are provided to protect the sides of the pickup truck on which the ladder is used.

Another important objective is to provide a compact and portable access ladder system in which the stairs may be easily installed, and in which the ladder is neatly and securely stowed when not in use, for example when the pickup truck is in service over the road.

Finally, another important objective is to provide a high strength access ladder design which can be conveniently and easily built with conventional manufacturing processes, and conventional materials, so that manufacturing costs are minimized.

SUMMARY

I have now invented an access ladder for vehicles, and specifically for access to pickup truck beds, which provides for easy stowage of the ladder when not in use, and which provides low cost, convenient access to pickup truck beds. This is important since it reduces the cost for owners of pickup trucks, and increases the safety of access to and from a pickup truck bed.

In various embodiments, an access ladder as disclosed herein may include three major components. These major components are (a) a base, the base having a pair of spaced apart "J" shaped brackets, each of the "J" shaped brackets having a proximal end, a distal end, and bar portion between the proximal end and the distal end, (b) a handle that may be attached to one of the "J" shaped brackets, and (c) a stair portion. The stair portion includes a pair of flexible support members, which are each flexibly attached to and secured at or near the distal end of one of the "J" shaped brackets. The stair portion also includes a set of steps, with each step in the set of steps having an upper side, a lower side, a front, and a back, and a pair of openings therethrough between the upper side and the lower side sized and shaped to allow the passage therethrough of the pair of flexible support members. In an embodiment, a plurality of sets of spacer stops are affixed to the flexible support members, wherein a set of the spacer stops are located beneath each step in the set of steps. In this manner, spacing between steps in the set of steps is maintained by the sets of spacer stops, when the steps are used and weight is placed on one or more of the steps in the set of steps.

Moreover, the access ladder system needs no extra parts, bolts, or other components for on-site assembly and deployment. Resultantly, the access ladder is easy to use, since all components are already installed.

BRIEF DESCRIPTION OF THE DRAWING

The present invention(s) will be described by way of exemplary embodiments, using for illustration the accompanying drawing in which like reference numerals denote like elements, and in which.

Figure 1:
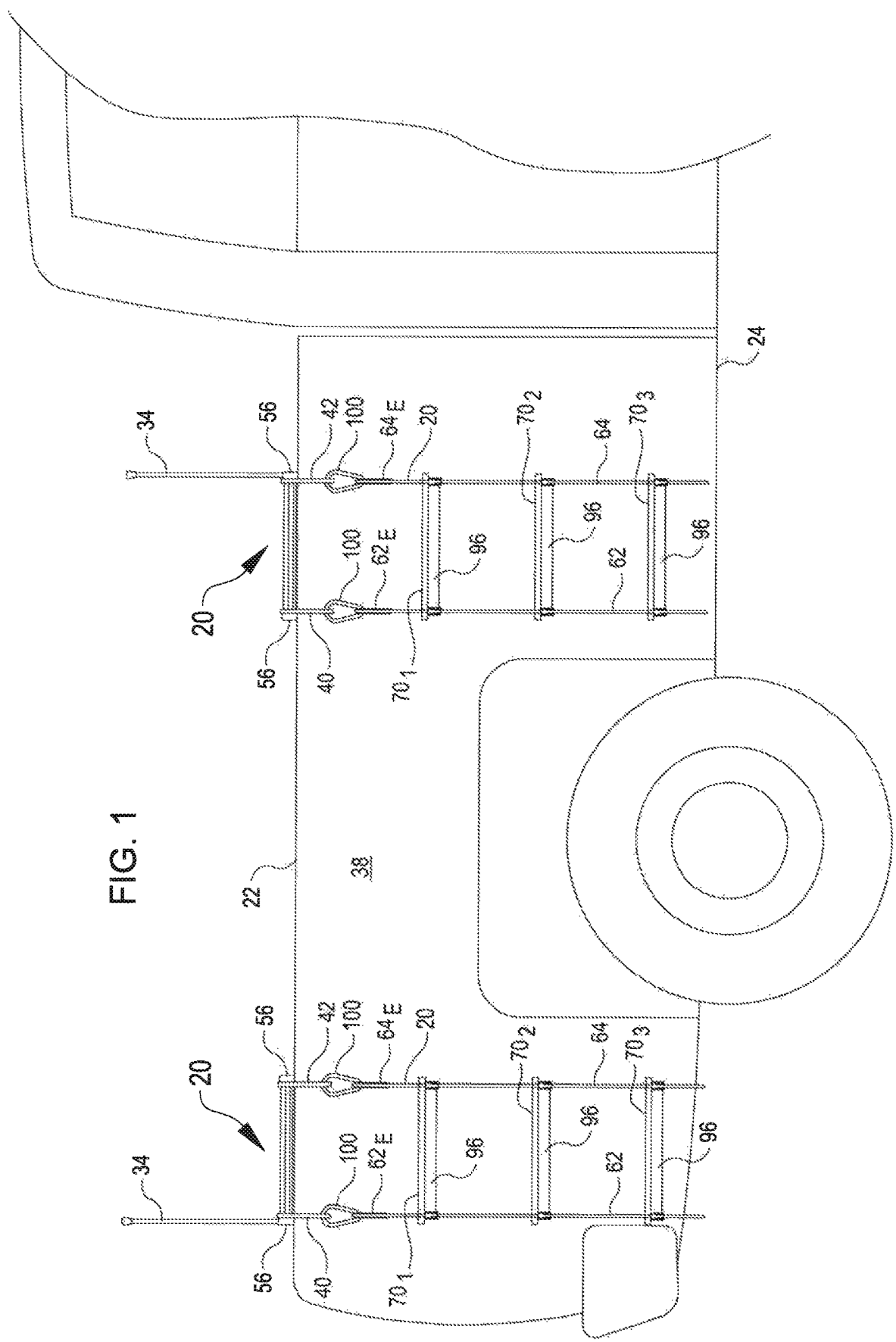
FIG. 1 is a side elevation view of a pickup truck bed on which a pair of access ladder has been installed, and in which a handle is shown mounted on the left side of the ladder, at the rear of the pickup truck bed, and on the right side of the ladder, at the front of the pickup truck bed.

The foregoing figures, being merely exemplary, contain various elements that may be present or omitted from a final configuration for an embodiment of an access ladder system that may be securely deployed to provide access to a pickup truck bed, or that may be implemented in various embodiments described herein for an access ladder system. Other variations in access ladder systems for use with pickup truck beds may use other mechanical structures, mechanical arrangements, or size and shape of components, and yet employ the principles described herein and as generally depicted in the drawing figures provided, and as more specifically called out in the claims set forth below. In particular, although various configurations dimensions may be utilized by those of skill in the art to make and use the claimed invention, and there is no intention to limit the claimed invention to dimensional data, any of which is exemplary rather than mandatory. Thus, an access ladder may be provided which is sized up or down from any dimensions provided, without affecting the scope of the appended claims. An attempt has been made to draw the figures in a way that illustrates at least those elements that are significant for an understanding of an exemplary access ladder system which may be used in various types of vehicles.

It should be understood that various features may be utilized in accord with the teachings hereof, as may be useful in different embodiments as useful for various sizes and shapes of an access ladder for pickup trucks, depending upon the specific requirements (such as typical height of the bottom of a pickup truck bed or inward lip portion above the road) within the scope and coverage of the teachings herein as defined by the claims. Further, like features in various embodiments for an access ladder may be described using like reference numerals, or other like references, without further mention thereof.

DETAILED DESCRIPTION

Figure 2:
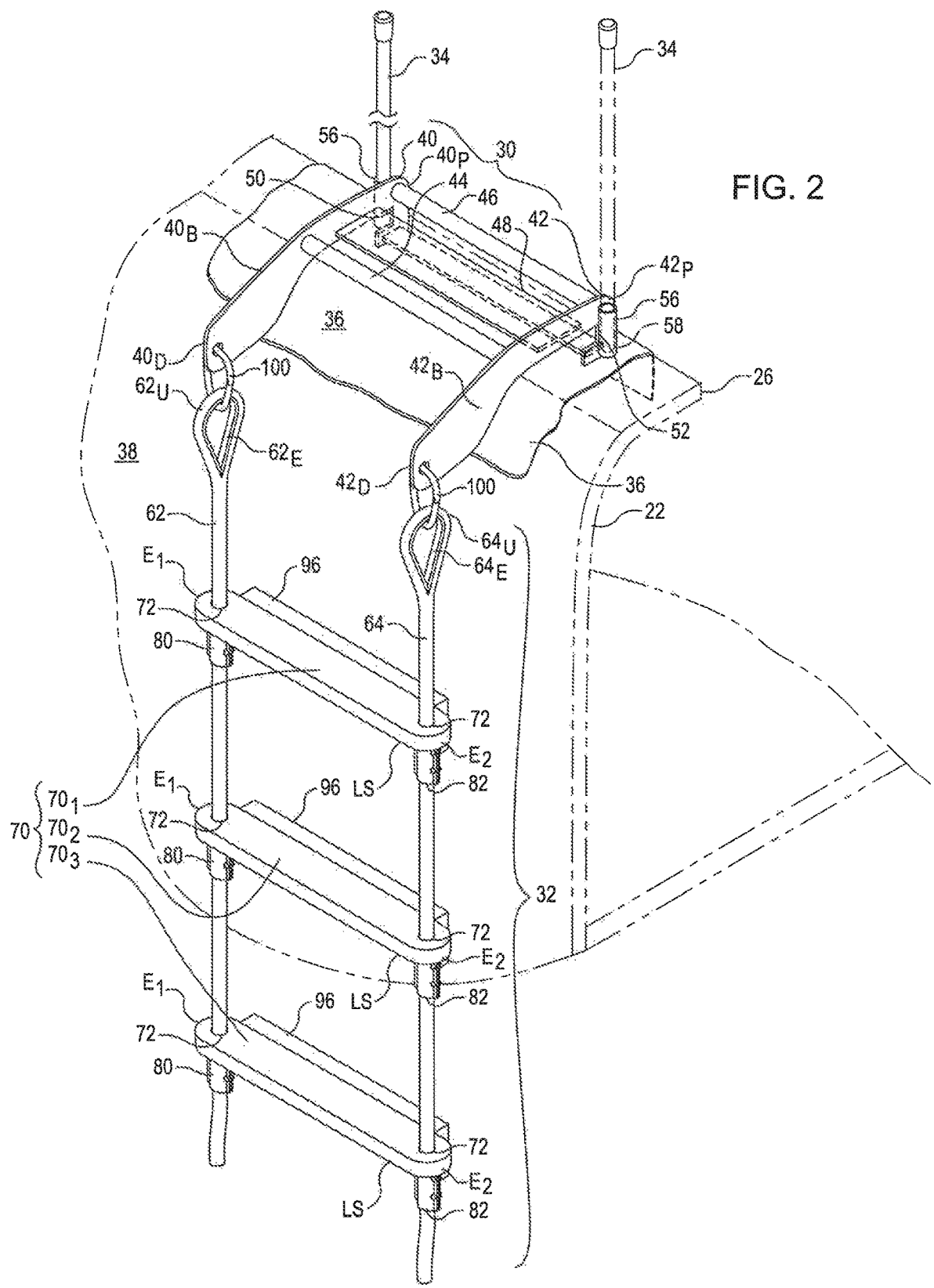
FIG. 2 is a perspective view of an embodiment for an access ladder system, showing the access ladder deployed on a pickup truck bed, with the "J" shaped brackets attached to an inward lip portion of the pickup truck bed, and with the stairs extending downward from the distal end of the "J" shaped brackets.
Figure 3:
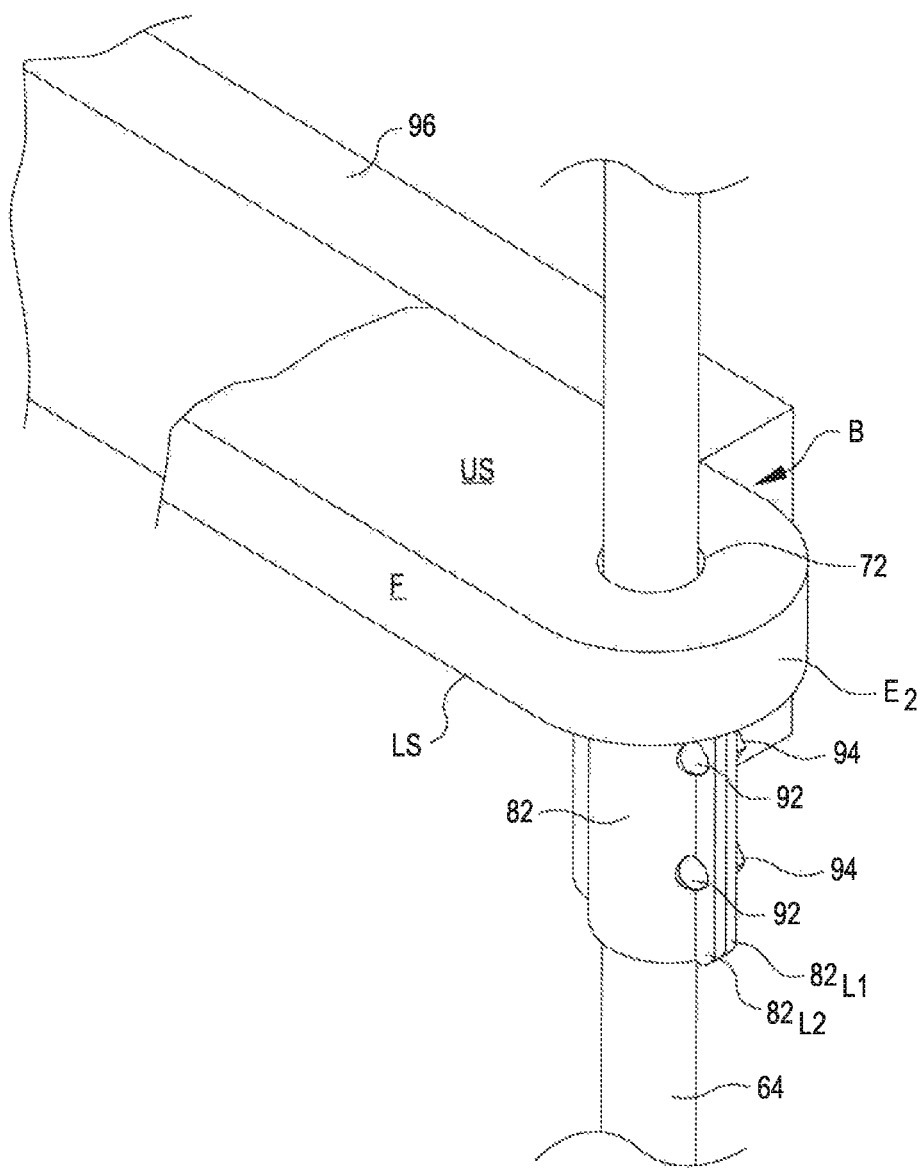
FIG. 3 is a partial perspective of a step as deployed on the access ladder described herein, showing the flexible member which passes through an aperture in the step, and showing a spacer stop which supports the step, as well as a bumper which protects the side of the pickup truck from the scratching or blemishes due to abrasion between a step and the side of the pickup truck.

Attention is directed to FIG. 2, where a perspective view of an access ladder 20 removably mounted on a bed 22 of a pickup truck 24 (see FIG. 1) having an inward lip portion 26. The access ladder 20 includes a base 30, a stair portion 32, and a handle 34. A protective mat 36 may be provided to prevent scratching or abrasion between the access ladder 20 and the outer surface 38 of pickup truck 24. The protective mat 36 may be provided in the form of a safety cloth, such as a woven or non-woven textile, with a selected composition and relatively thin but of sufficient thickness to provide the desired protection for the outer surface 38 of the pickup truck 24, so as to minimize or prevent scratching of the outer surface 38 of pickup truck 24 bed 22.

In an embodiment, the base 30 may be provided in the form of a pair of spaced apart "J" shaped brackets 40 and 42. Each of the "J" shaped brackets 40 and 42 have a proximal end ($40_P$, $42_P$) a distal end ($40_D$, $42_D$), and bar portion ($40_B$, $42_B$) between the proximal end ($40_P$, $42_P$) and the distal end ($40_D$, $42_D$). The bar portions ($40_B$, $42_B$) each have a length L, which may be about thirteen and a half inches (1.3.5"), or more broadly in the range of from about ten (10) inches to about fifteen (15) inches, in various cases as may be appropriate for a particular pickup truck bed design. In an embodiment, the weight of access ladder 20 may be about ten (10) pounds. A plurality of spacers (44, 46) are provided to securely space apart the "J" shaped brackets, 40 and 42. In an embodiment, a floor panel 48 may also be provided between "J" shaped brackets 40 and 42. In an embodiment, the floor panel 48 may comprise a non-skid compound, such as a synthetic rubberized surface, to minimize or prevent slippage by a user when climbing the access ladder 20.

The "J" shaped brackets 40 and 42 have an open jaw portion 50 and 52, respectively near their proximal ends ($40_P$, $42_P$). The open jaw portions 50, 52 are sized and shaped for secure engagement with the pickup truck bed 22, and in an embodiment, with the inward lip portion 26 of the pickup truck bed 22.

In order to provide the user with an additional balance tool, one or more handle receivers 56 are provided, into which a first end 58 of a handle 34 may be inserted for secure mating engagement.

The stair portion 32 includes a pair of flexible support members (62, 64). Each one of the pair of flexible support members (62, 64) are flexibly attached to and secured at or near the distal end ($40_D$, $42_D$), of one of the "J" shaped brackets 40 and 42. A set of steps 70 is provided, in a set $70_1$ through $70_N$, where N is a positive integer greater than one. In an embodiment, at least two steps $70_1$ and $70_2$ may be provided. In an embodiment, at least three steps $70_1$, $70_2$, and $70_3$ may be provided. Each step ($70_1$ through $70_N$) in the set of steps 70 has an upper side US, a lower side LS, a front F, and a back B. Each step ($70_1$ through $70_N$) in the set of steps 70 has an aperture 72 therethrough, to provide an opening between its respective upper side US and its lower side LS. The aperture 72 allows the passage through each step ($70_1$ through $70_N$) of flexible support members 62 and 64. The flexible support members 62 and 64 may be conveniently located to pass through steps ($70_1$ through $70_N$) near opposing ends ($E_1$, $E_2$) of each step ($70_1$ through $70_N$). In an embodiment, the flexible support members 62 and 64 may be generally cylindrical in shape. In an embodiment, the flexible support members 62 and 64 may be provided in the form of a rope.

Spacer stops (80, 82) may be used for secure attachment to flexible support members 62 and 64. A set of spacer stops 80, 82 may be affixed to a pair of flexible support members (62, 64) beneath each step ($70_1$ through $70_N$) in a set of steps 70. Use of the of spacer stops 80, 82 enables the provision of selected spacing between steps. In an embodiment, equidistant spacing distance D between steps ($70_1$ through $70_N$) may be maintained. In an embodiment, distance D may be about fifteen (15) inches.

In an embodiment, apertures 72 in each step ($70_1$ through $70_N$) in the set of steps 70 may be sized and shaped to allow the passage of a flexible support member (62, 64) therethough, but are sized and shaped to prevent the passage of the spacer stops (80, 82) therethrough when weight is applied to any one or more of the steps ($70_1$ through $70_N$).

Figure 5:
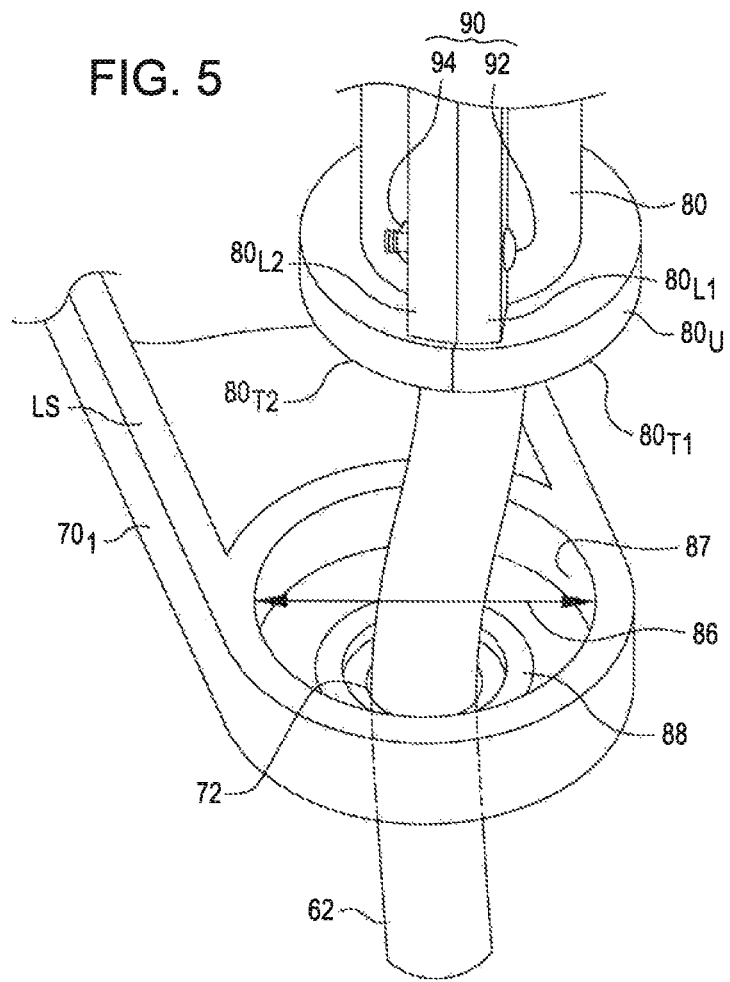
FIG. 5 is a partial exploded perspective of the underside of a step as deployed on the access ladder described herein, showing details of construction of the receiving socket and receiving ledge against which a spacer stop, which clamps to the flexible member, supports the step.

The spacer stops (80, 82) engage and bear against the lower side LS of steps (70₁ through 70_N) in the set of steps 70. In an embodiment, each of the steps (70₁ through 70_N) may further include, on the lower side LS thereof, spacer stops (80, 82) and receiving sockets (86), partially defined by interior sidewall 87 in FIG. 5, sized and shaped for secure mating engagement with an upper portion (80_U, 82_U) of a spacer stop (80, 82). The receiving sockets 86 may include, on the lower side LS of steps (70₁ through 70_N), a receiving ledge 88 recessed into the lower side LS adjacent an aperture 72. The receiving ledge 88 is sized and shaped to receive the upper stop flanges (80_T1, 80_T2 and 82_T1 and 82_T2), and thereby secure said spacer stops (80, 82) to a step (70₁ through 70_N).

Figure 4:
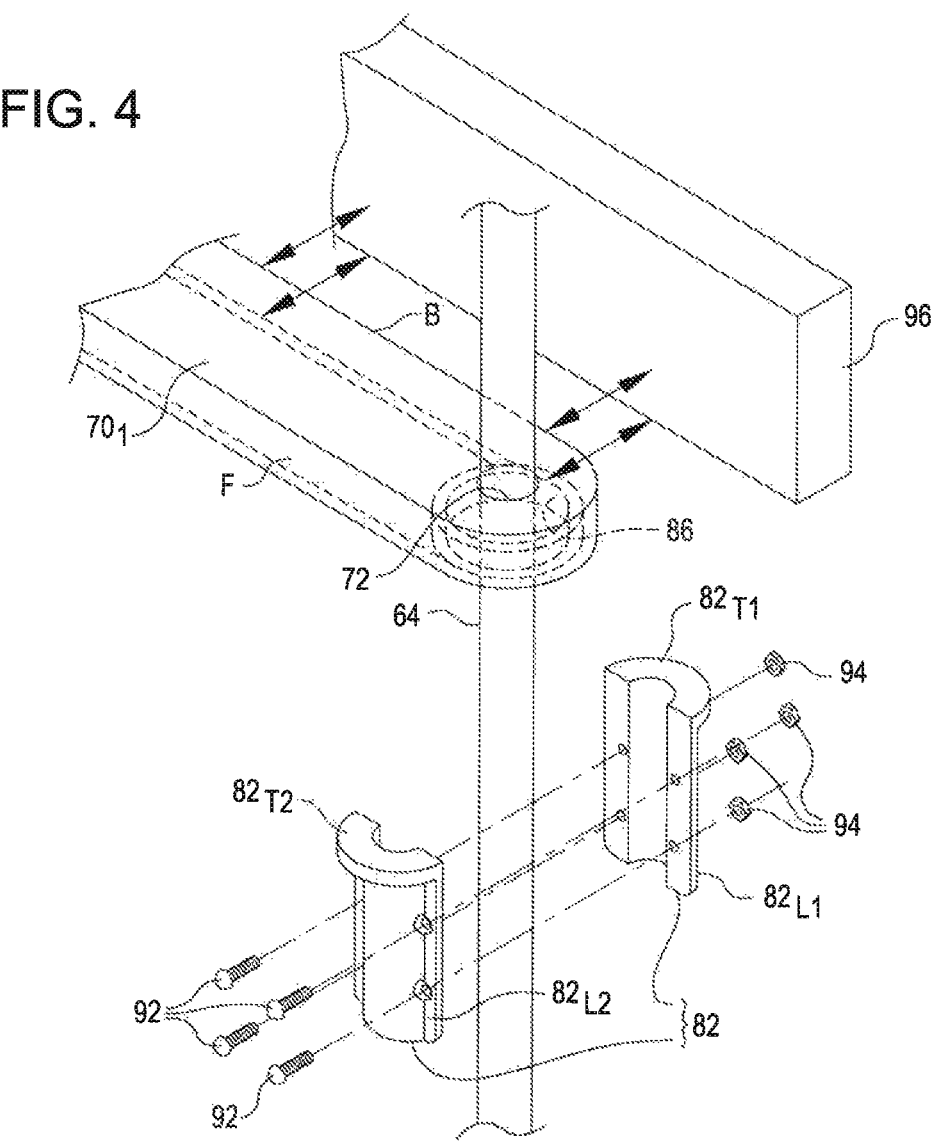
FIG. 4 is a partial exploded perspective of a step as deployed on the access ladder described herein, similar to the view shown in FIG. 3 above, but now showing details of construction of the spacer stop that clamps to the flexible member and which supports the step.

In an embodiment (see FIG. 4), the spacer stops (80, 82) may be provided as mating generally one-half annular cylindrical shaped structures. In an embodiment the one-half annular cylindrical shaped structures may further include upper stop flanges (80_T1, 80_T2 and 82_T1 and 82_T2) and lateral mating flanges (80_L1, 80_L2 and 82_L1 and 82_L2). As also seen in FIG. 4, the lateral mating flange pairs (80_L1, 80_L2 and 82_L1 and 82_L2) may be configured for secure mating engagement with each other, and for secure engagement against one of the flexible support members (62, 64) via a fasteners 90, such as may be provided by screws 92 and nuts 94.

In an embodiment, each of stairs (70₁ through 70_N) may be provided with a bumper 96. In an embodiment, the bumper 96 may be affixed to the back B of a step (70₁ through 70_N). The bumpers are provided to space the steps (70₁ through 70_N) away from the pickup truck bed 22, to avoid scratching or abrasion of the outer surface 38 of the pickup truck 24.

In an embodiment, each of flexible support members (62, 64) has an upper end (62_U, 64_U). In an embodiment the upper end (62_U, 64_U) may be provided by an eyelet (62_E, 64_E). In an embodiment, each one (62, 64) of the pair of flexible support members is flexibly affixed to one of the "J" shaped brackets (40, 42) with a retainer 100. In an embodiment, the retainer 100 may be provided in the form of a carabiner.

It is to be appreciated that the access ladder taught herein is an appreciable improvement in the art of access for pickup truck beds, or other vehicles. The novel design addresses the problem of how to cost effectively provide access to pickup truck beds which are sufficiently high that access is otherwise difficult, or gained only through expensive factor add on parts such as custom rear tailgates. The embodiments have been thoroughly described to enable those of ordinary skill in the art to make and use the invention, including embodiments which utilize lightweight parts, and which provide resistance against scratching or otherwise disturbing the surface of the vehicle.

Although only a few exemplary embodiments have been described in detail, various details are sufficiently set forth in the drawings and in the specification provided herein to enable one of ordinary skill in the art to make and use the invention(s), which need not be further described by additional writing in this detailed description. It will be readily apparent to those skilled in the art that the pickup truck bed access ladder described herein may be modified from those embodiments provided herein, without materially departing from the novel teachings and advantages provided.

The aspects and embodiments described and claimed herein may be modified from those shown without materially departing from the novel teachings and advantages provided by this invention, and may be embodied in other specific forms without departing from the spirit or essential characteristics thereof. Therefore, the embodiments presented herein are to be considered in all respects as illustrative and not restrictive. As such, this disclosure is intended to cover the structures described herein and not only structural equivalents thereof, but also equivalent structures. Numerous modifications and variations are possible in light of the above teachings. It is therefore to be understood that within the scope of the appended claims, the invention(s) may be practiced otherwise than as specifically described herein. Thus, the scope of the invention(s), as set forth in the appended claims, and as indicated by the drawing and by the foregoing description, is intended to include variations from the embodiments provided which are nevertheless described by the broad interpretation and range properly afforded to the plain meaning of the claims set forth below.

The invention claimed is:

1. An access ladder for access to a pickup truck bed having an inward lip portion, said access ladder comprising:
   (a) a base, said base comprising
      a pair of spaced apart "J" shaped brackets, each of said "J" shaped brackets having a proximal end, a distal end, and bar portion between said proximal end and said distal end, said bar portion having a length L;
      a plurality of spacers that securely space apart said "J" shaped brackets,
      said "J" shaped brackets having an open jaw portion at a proximal end, said open jaw portion sized and shaped for secure engagement with said inward lip portion of said pickup truck bed; and
      one or more handle receivers, said one or more handle receivers sized and shaped to receive a first end of a handle;
   (b) a handle;
   (c) a stair portion, said stair portion, said stair portion comprising
      a pair of flexible support members, each one of said pair of flexible support members flexibly attached to and secured at or near a distal end of one of said "J" shaped brackets;
      a set of steps, each step in said set of steps having an upper side, a lower side, a front, and a back, and a pair of openings therethrough between said upper side and said lower side, to allow the passage therethrough by said pair of flexible support members;
      a plurality of sets of spacer stops on said flexible support members, a set of said spacer stops located beneath each step in said set of steps, whereby spacing between steps in said set of steps is maintained by said sets of spacer stops;
      a plurality of bumpers.

2. The access ladder as set forth in claim 1, wherein the openings in each step in said set of steps is sized and shaped to allow the passage of the flexible support member therethough but are sized and shaped to prevent the passage of said spacer stops therethrough, when weight is applied to steps and the spacer stops engage and bear against the lower side of a step in said set of steps.

3. The access ladder as set forth in claim 2, wherein said spacer stops comprise a tubular configuration, and wherein said flexible support members are generally cylindrical in shape.

4. The access ladder as set forth in claim 3, wherein said spacer stops comprise mating one-half annular cylindrical shaped structures, said mating one-half annular cylindrical shaped structures further comprising upper stop flanges and lateral mating flanges.

5. The access ladder as set forth in claim 4, further comprising a fastener set, and wherein said lateral mating flanges are configured for secure mating engagement with each other, and for secure engagement against one of said flexible support members via said fastener set.

6. The access ladder as set forth in claim 4, wherein each one of said steps in said set of steps further comprises, on the lower side thereof, a receiving ledge recessed into said lower side adjacent said aperture therethrough, said receiving ledge sized and shaped to receive said upper stop flanges, and thereby secure said spacer stops to said step.

7. The access ladder as set forth in claim 1, wherein said set of steps comprise at least three steps.

8. The access ladder as set forth in claim 1, wherein each one of said plurality of bumpers is affixed to the back of a step in said set of steps.

9. The access ladder as set forth in claim 1, wherein said flexible member comprises a rope.

10. The access ladder as set forth in claim 1, wherein an equal distance D is provided between each of the steps in said set of steps.

11. The access ladder as set forth in claim 1, wherein each one of said pair of flexible support members has an upper end, and wherein said upper end comprises an eyelet.

12. The access ladder as set forth in claim 11, wherein each one of said pair of flexible support members is flexibly affixed to one of said "J" shaped brackets with a retainer.

13. The access ladder as set forth in claim 12, wherein said retainer comprises a carabiner.

14. The access ladder as set forth in claim 1, further comprising a safety cloth, said safety cloth sized and shaped for placement between said "J" shaped bracket and said pickup truck bed, so as to minimize or prevent scratching of said pickup truck bed by said "J' shaped bracket.

* * * * *

UNITED STATES PATENT AND TRADEMARK OFFICE
CERTIFICATE OF CORRECTION

PATENT NO. : 10,843,631 B1
APPLICATION NO. : 16/795940
DATED : November 24, 2020
INVENTOR(S) : Gerald L. Honeysett It is certified that error appears in the above-identified patent and that said Letters Patent is hereby corrected as shown below:

In the Specification

Column 2, Line 58, after the words "pair of access", delete "ladder has" and substitute therefore --ladders have--.

Column 4, Line 2, after the words "pickup truck", delete "24".

Column 4, Line 9, after the words "thirteen and a half inches", delete "(1.3.5")" and substitute therefore --(13.5")--.

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*